United States Patent [19]

MacInnis

[11] Patent Number: 5,012,888

[45] Date of Patent: May 7, 1991

[54] SHIFTING METHOD AND APPARATUS

[76] Inventor: Richard F. MacInnis, P.O. Box 2541, White City, Oreg. 97503

[21] Appl. No.: 120,033

[22] Filed: Nov. 13, 1987

[51] Int. Cl.$^5$ .............................................. B60K 17/00
[52] U.S. Cl. .................................. 180/336; 74/473 R
[58] Field of Search ................. 180/336, 75.1; 74/473, 74/476, 477

[56] References Cited

U.S. PATENT DOCUMENTS

| | | | |
|---|---|---|---|
| 1,254,349 | 1/1918 | Patch | 180/336 |
| 4,515,033 | 5/1985 | Carlo | 74/476 |

FOREIGN PATENT DOCUMENTS 3000 10/1981 PCT Int'l Appl. ................ 180/336

Primary Examiner—Kenneth R. Rice

Attorney, Agent, or Firm—Herbert C. Schulze

[57] ABSTRACT

A method and apparatus for electrically activating range shift apparatus in transmissions of trucks or the like wherein the activation which is customarily by an air line from the shift knob is caused to occur in the direct proximity of the transmission, rather than is usually the case where the air lines or the like come into the truck cab or the like and are generally associated with the shift bar and activated by means directly at the shift knob. In the present case an electrical switch is provided at the knob and electrical wires are carried through the shift bar directly to the proximity of the transmission at which point solenoid valves are arranged so as to accomplish the pressure through the various air lines as required right at the transmission location.

2 Claims, 2 Drawing Sheets

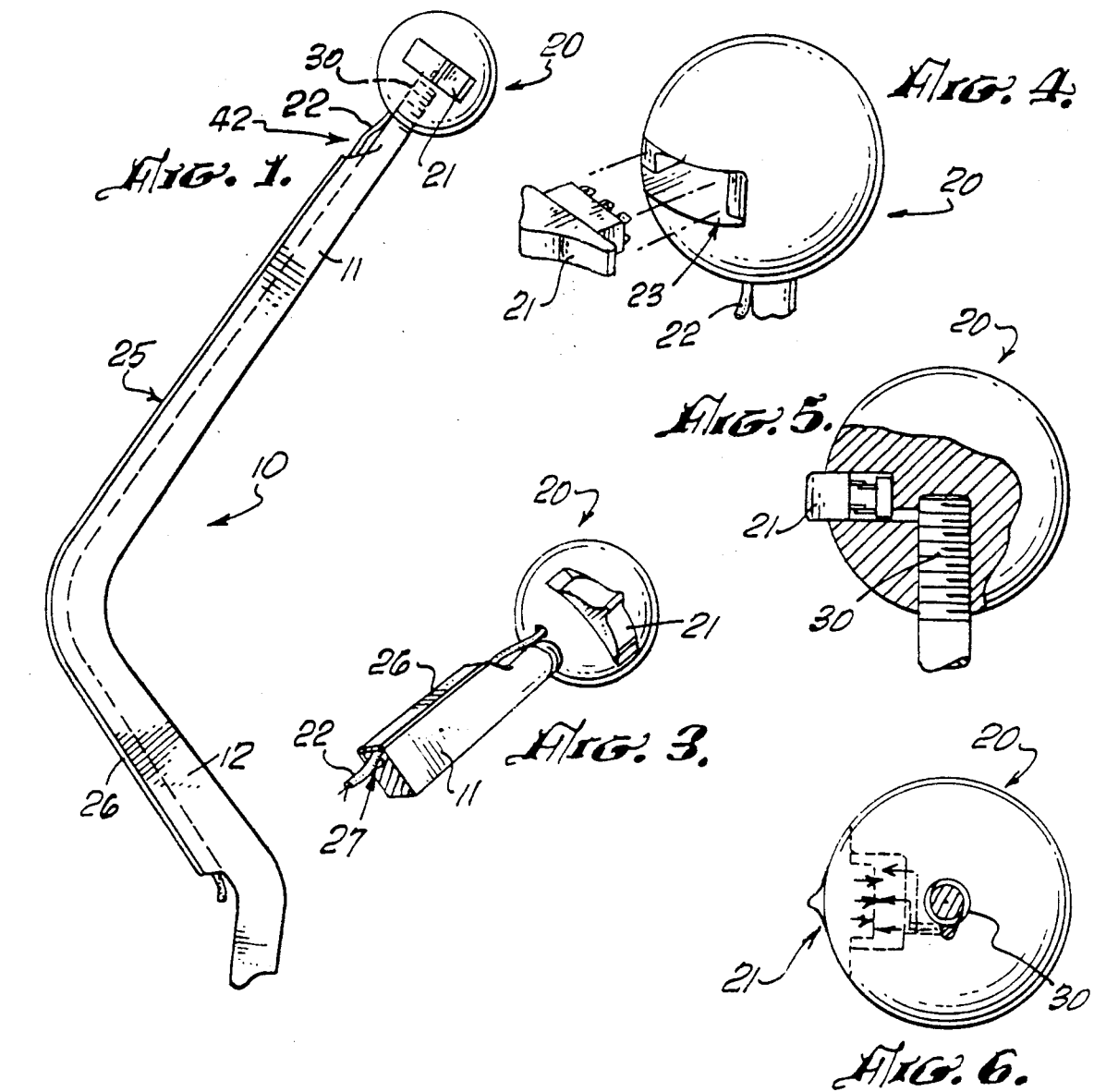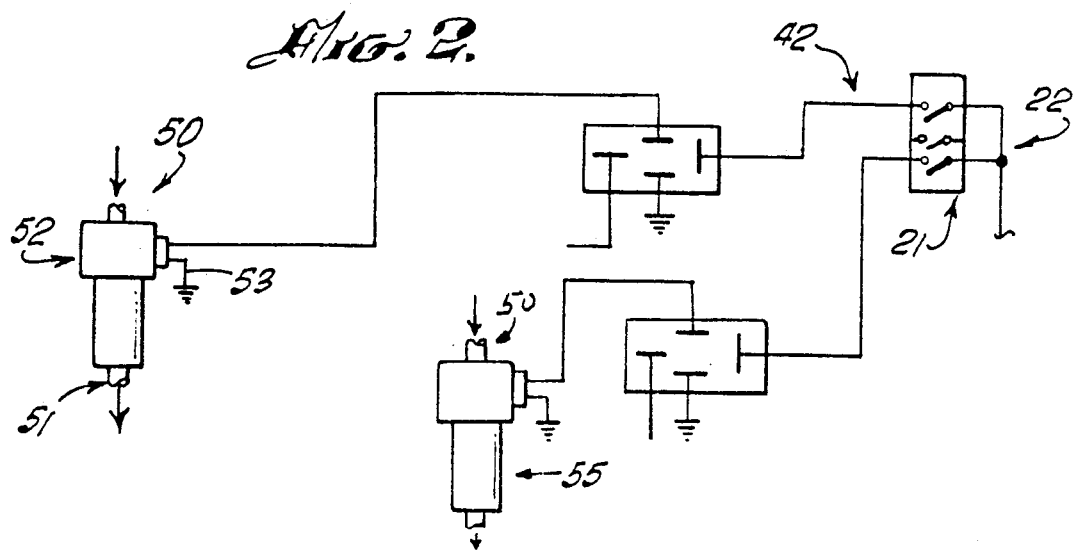

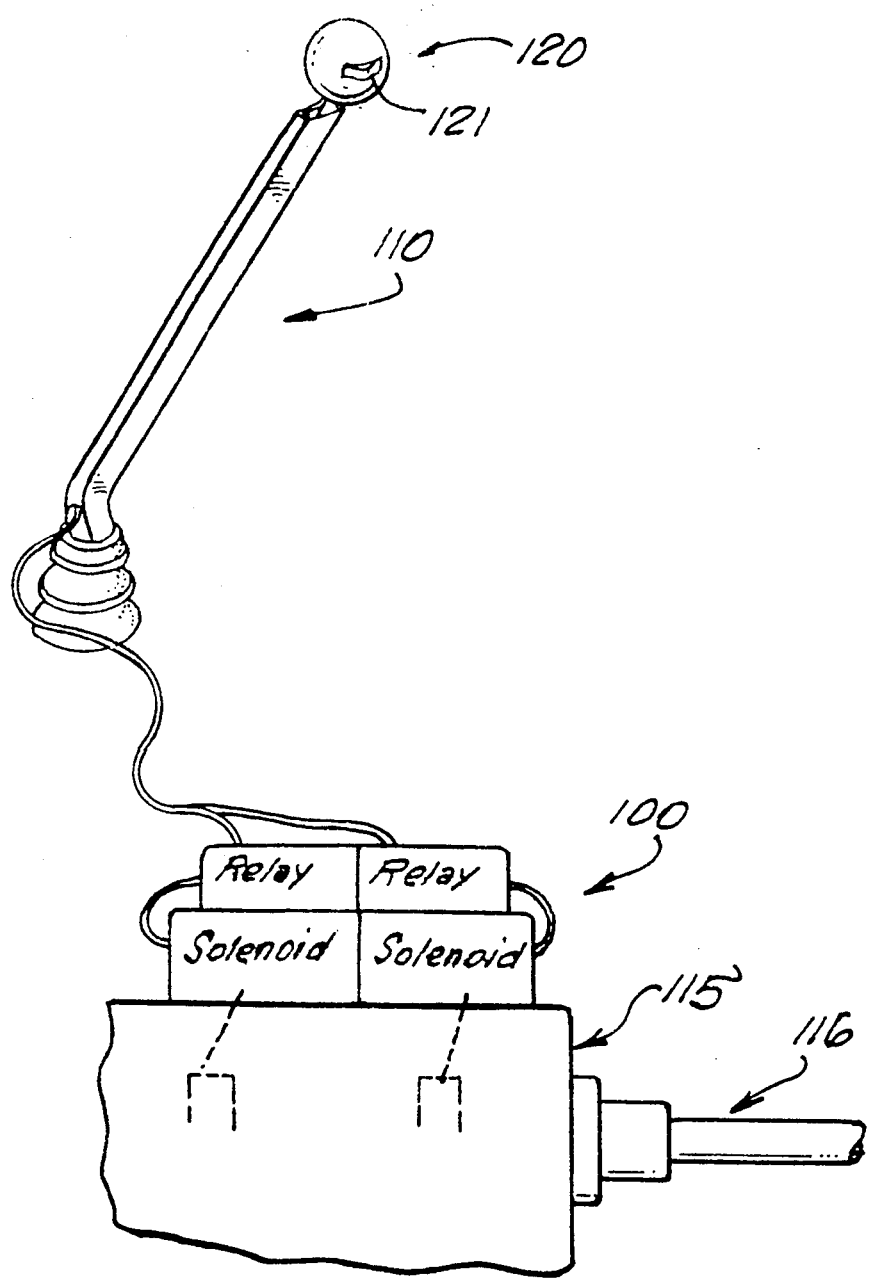

SHIFTING METHOD AND APPARATUS

CROSS REFERENCE TO RELATED PATENT APPLICATIONS

There are no patent applications filed by me related to this invention except for my application for "Shift Bar" being filed concurrently herewith.

BACKGROUND OF THE INVENTION

I. Field of the Invention

This invention is in the general field of mechanism for shifting transmissions from one drive to another; the invention is even more particularly directed to a control lever or shift bar for accomplishing the change between the transmisison modes; the invention is even more particulary directed to a shift bar having means associated therewith to electrically activate pneumatic hoses or the like utilized in the shifting process; the invention is even more particularly directed to such a shift bar wherein a new type knob is used having an electrical switching connection therein and wherein electrical wires which are activated by the switch in the knob are carried within a slot or otherwise protected area in the shift bar.

II. Description of the Prior Art

All of the prior art known to me for shift bars in trucks, truck tractors, and the like, comprise round rods with a handle and in some cases tape or other fastening material utilized for the purpose of holding pneumatic hoses or the like associated with the shifting process against the exterior of said rods.

I have in this invention, for the first time, eliminated pneumatic hoses or the like associated directly with the shift bar. This even eliminates and supersedes, where desired, my invention as described in patent application being filed concurrently herewith entitled "Shift Bar" and therefore there is no prior art of any nature known to me wherein the knob of the shift bar carries electrical switching arrangement as described herein and wherein the shift bar itself carries electrical conducting wires directly to the transmission for activation of the air lines required in shifting the ranges in the transmission of the vehicle involved.

SUMMARY OF THE INVENTION

Many vehicles and the like, and particularly automotive truck tractors and trucks are equipped with transmissions for changing speeds (and direction of travel) as is known to those skilled in the art. Most of the heavier equipment of this nature utilizes transmission shifting apparatus which comprises a combination of a manually activated shifting bar in combination with a pneumatically assisted apparatus for changing the ranges. There are air lines or the like which activate this system of changing ranges. This will be understood by those skilled in the art in that customarily a large truck or the like will have two or three transmission ranges and then within each range there will be a number of gear shift positions. The shifting rod itself is utilized for the purpose of shifting from gear position to another gear position within each range. However, in changing the basic range, this is done by the use of air hoses as will be known to those skilled in the art wherein the hose will be activated to activate a cyclinder or the like in conjunction with the transmission which will change the entire shift range. The shift bar is customarily a rod of round cross section with a handle at one end and a connection adjacent the transmission at the other end. Normally a number of pneumatic hoses (usually three or four) will extend from the handle to an arrangement by which they may go through the floor of the cab and connect to a cooperative relationship with the transmission for pneumatically changing ranges of the transmission. These hoses will either hang loosely from the handle or they may be taped, wired or otherwise held in some connection with the shift bar. This arrangement is not only unsightly, but creates the possibility of the hoses tangling with other objects, including, but not limited to, the foot or leg of the vehicle operator. It is not at all uncommon for hoses to be broken or damaged because the lines are external and are taped or tied to the outside of existing shift bars or may even be completely loose hanging therefrom, and are easily damaged particularly where they run through the floorboard.

Additionally, the round bar is susceptable of bending when subjected to heavy and sudden pressures in shifting.

I have conceived and developed a new and superior shift rod in which the hoses are carried within the rod, and which is the subject of a separate patent application filed by me concurrently herewith entitled "Shift Bar". However, I have gone a step further and conceived a completely novel arrangement and have developed the same wherein I am able to eliminate the use of air hoses along side of the shift bar or in connection with it and combine all hose directly approximate the location of transmission and to activate such hoses as required in range shifting by means of an electrical switch associated with the knob of a shift bar formed of a flat, rather than the customary round, shift bar and wherein electrical wires run in an enclosed conduit along one edge of the flat shift bar. By doing this I eliminate additional problems which are sometimes associated with lengthy air lines along the shift bar. Under cold conditions there may be condensate within such lines which causes inefficiency of the operation, additionally, the time involved for the air activation of the shifting of ranges is reduced essentially to zero, since in the customary condition where hoses are used along the shift bar up to the knob and activated there, it takes time for the pressure to build and activate the range shift.

It is an object of this invention to eliminate the need of air hoses along shift bar and to the shift knob;

Another object of this invention is to eliminate some of the difficulties associated with long air hoses utilized to accomplish the range shifting within the transmission;

Another object of this invention is to prevent the lapse of time necessary for the required pressure to activate the range shifting in a transmission.

The foregoing and other objects and advantages of this invention will become apparent to those skilled in the art upon reading the description of a preferred embodiment, which follows, in conjunction with a review of the appended drawings.

BRIEF DESCRIPTION OF THE DRAWINGS

FIG. 1 is a partially broken away elevational view partially in phantom of an apparatus suitable to practice the method of this invention;

FIG. 2 is a schematic diagram illustrating the use of this method in activating range shift control;

FIG. 3 is a partially sectioned view of the knob and the knob end of the shift bar suitable to be used in practicing the method of this invention;

FIG. 4 is an enlarged view of the knob shown in FIG. 3 with the switch shown detached from its location within the knob;

FIG. 5 is a partially broken away, partially sectioned side view of the knob in place on the shift rod showing the location of the switch within the knob;

FIG. 6 is a bottom elevation of the knob illustrating schematically switch wire connections; and FIG. 7 is a schematic illustration of the transmission and the shift bar and knob which can be utilized in practicing the method of this invention, utilizing for this illustratione a slightly different configured shift bar.

DESCRIPTION OF A PREFERRED EMBODIMENT

For a clarity and ease of understanding it is best to examine FIG. 7 first. FIG. 7 shows the shift bar generally 110, the shift bar knob generally 120, the electrical solenoid and relay arrangement utilized in the invention generally 100, the transmission generally 115, and a drive shaft generally 116.

In examining FIG. 2 the transmission range shifters generally 52 and 55 show provision for the air hose at 50 with the item 52 being a part of the shifter 51 will contain a solenoid activated valve, as will shifter 55.

The circuitry will be clear to those skilled in the art, and the switch will be as indicated generally 21 and will contain switching elements 22 as will be known to those skilled in the art. The electrical power will be transmitted as desired directed to different range shifting elements as desired by the positioning of the switch. Slide switches of this nature are known to those skilled in the art and require no further description it being understood that the electrical current will go to the position to which the slide switch has been set.

A preferred shift bar will be generally in the configuration as shown in FIG. 1 wherein a flat, dog leg shape is utilized with a round knob at the top, and the electrical wire running down the front edge through channel generally 42. The wires 22 are covered by a suitable covering plate, tape, plastic filled material, or the like as may be desired along the edges 25 and 26 so as to provide a pleasing effect and a completely safe and servicable unit. A channel generally 42 is shown specifically at 27 in FIG. 3.

If desired, an arrangement of this nature could also be used with the commonly used round cross sectioned shift bars either by carrying the electrical wires along side the shift bar with an appropriate switch either mounted within the shift bar knob or otherwise mounted in conjunction with the apparatus. Such an arrangement could be utilized to practice the method of this invention but is not felt to be the most desirable, since in the preferred embodiment which I have shown, the entire unit including the wires are well protected from accidental damage by striking another object or otherwise. In operation, the shift bar will be used in the customary manner to shift from one gear setting to another within a range which may encompass as many as seven different individual gearing ratios within one fundamental range. Customarily, when all of the individual settings within one range have been exhausted, then the switch will be used to carry low voltage current to a relay which when activated carrys a higher voltage current to the solenoid valve to activate the appropriate pressure to cause the gear shift range desired to be activated. Within the changed range, the same shift bar is used to shift to different gear ratios within that range. This will be understood by those skilled in the art and accustomed to the workings of transmissions having various ranges as well as various ratios within each range.

While the embodiment of this invention shown and described is fully capable of achieving the objects and advantages desired, it is to be understood that such embodiment is for purposes of illustration only and not for purposes of limitation.

I claim:

1. Apparatus for changing the shift range of a transmission having multiple ranges comprising a shift bar which cooperates with the transmission to enable shifting to various gear ratios within a given shift range; an electrical switch associated with said shift bar and connected to wires in such a manner as to enable the carrying of current to a solenoid valve capable of activating a range switching mechanism within a transmission; said shift bar being essentially dog leg shaped and rectangular in cross section; and said electrical wires being carried in a channel along one edge of said shift bar.

2. The apparatus of claim 1 wherein the channel is covered along the edge so as to protect the electrical wires therein.

* * * * *